US011921802B2

(12) United States Patent
Martin

(10) Patent No.: US 11,921,802 B2
(45) Date of Patent: *Mar. 5, 2024

(54) METHODS, SYSTEMS, AND APPARATUS FOR GENERATING SEARCH RESULTS

(71) Applicant: PayPal, Inc., San Jose, CA (US)

(72) Inventor: Todd Martin, Los Gatos, CA (US)

(73) Assignee: PayPal, Inc., San Jose, CA (US)

(*) Notice: Subject to any disclaimer, the term of this patent is extended or adjusted under 35 U.S.C. 154(b) by 280 days.

This patent is subject to a terminal disclaimer.

(21) Appl. No.: 17/164,333

(22) Filed: Feb. 1, 2021

(65) Prior Publication Data

US 2021/0248197 A1    Aug. 12, 2021

Related U.S. Application Data

(63) Continuation of application No. 15/854,691, filed on Dec. 26, 2017, now Pat. No. 10,909,194, which is a continuation of application No. 15/080,845, filed on Mar. 25, 2016, now Pat. No. 9,852,228, which is a continuation of application No. 13/946,174, filed on Jul. 19, 2013, now Pat. No. 9,298,785.

(51) Int. Cl.
*G06F 16/00* (2019.01)
*G06F 16/248* (2019.01)
*G06F 16/9535* (2019.01)
*G06Q 30/06* (2023.01)
*H04L 67/306* (2022.01)

(52) U.S. Cl.
CPC ........ *G06F 16/9535* (2019.01); *G06F 16/248* (2019.01); *G06Q 30/06* (2013.01); *H04L 67/306* (2013.01)

(58) Field of Classification Search
CPC ... G06F 16/9535; G06F 16/248; G06Q 30/06; H04L 67/306
See application file for complete search history.

(56) References Cited

U.S. PATENT DOCUMENTS

| | | | |
|---|---|---|---|
| 6,516,312 B1 * | 2/2003 | Kraft | G06F 16/30 707/999.005 |
| 7,249,126 B1 | 7/2007 | Ginsburg et al. | |
| 7,299,255 B2 * | 11/2007 | Tenorio | G06F 16/2228 709/201 |
| 7,412,424 B1 * | 8/2008 | Tenorio | G06Q 30/06 705/53 |
| 7,475,030 B1 * | 1/2009 | Tenorio | G06Q 30/0633 705/26.8 |
| 8,224,814 B2 | 7/2012 | Olson et al. | |

(Continued)

OTHER PUBLICATIONS

"4 Reasons ebay's Makeover Makes It Even Cooler", Online. Retrieved from the Internet: URL: http://webcache.googleusercontent.com/search?q=cache:6fp0511x4FMJ:www.she-finds.com/2010/ebays-revamped-fashion-site-makes-finding-hidden-treasures, Apr. 29, 2010, 4 pages.

(Continued)

*Primary Examiner* — Noosha Arjomandi
(74) *Attorney, Agent, or Firm* — Kowert, Hood, Munyon, Rankin & Goetzel, P.C.; Scott W. Pape; Dean M. Munyon

(57) ABSTRACT

Methods, systems, and apparatus to constrain a search are described. A selection of one or more items of a search result set by a user may be obtained. One or more attributes of the one or more selected items may be evaluated. One or more filters are identified based on the evaluated attributes.

20 Claims, 8 Drawing Sheets

(56) References Cited

U.S. PATENT DOCUMENTS

| | | | |
|---|---|---|---|
| 8,495,057 B2* | 7/2013 | Palermiti, II | G06F 16/5866 |
| | | | 707/769 |
| 8,631,029 B1 | 1/2014 | Amacker | |
| 8,666,909 B2* | 3/2014 | Pinckney | G06N 20/00 |
| | | | 706/11 |
| 9,285,234 B1 | 3/2016 | Graf et al. | |
| 9,298,785 B2 | 3/2016 | Martin | |
| 9,710,433 B2 | 7/2017 | Osindero et al. | |
| 9,852,228 B2 | 12/2017 | Martin | |
| 10,909,194 B2* | 2/2021 | Martin | G06Q 30/06 |
| 11,328,020 B2* | 5/2022 | Manoharan | G06F 16/9535 |
| 2002/0082901 A1 | 6/2002 | Dunning et al. | |
| 2003/0050821 A1 | 3/2003 | Brandt et al. | |
| 2003/0160770 A1 | 8/2003 | Zimmerman | |
| 2004/0001498 A1 | 1/2004 | Chen et al. | |
| 2004/0194141 A1* | 9/2004 | Sanders | H04N 21/47 |
| | | | 725/53 |
| 2005/0027705 A1 | 2/2005 | Sadri et al. | |
| 2005/0203800 A1 | 9/2005 | Sweeney et al. | |
| 2005/0251510 A1 | 11/2005 | Billingsley et al. | |
| 2006/0010029 A1 | 1/2006 | Gross | |
| 2006/0048042 A1 | 3/2006 | Sembower et al. | |
| 2006/0048053 A1 | 3/2006 | Sembower et al. | |
| 2006/0069672 A1 | 3/2006 | Maloney et al. | |
| 2006/0265391 A1 | 11/2006 | Posner et al. | |
| 2007/0027869 A1 | 2/2007 | Collins | |
| 2007/0038601 A1 | 2/2007 | Guha | |
| 2007/0055651 A1* | 3/2007 | Yamanaka | H04W 4/02 |
| 2007/0106949 A1 | 5/2007 | Narita et al. | |
| 2007/0162379 A1* | 7/2007 | Skinner | G06Q 30/0277 |
| | | | 705/37 |
| 2007/0226204 A1 | 9/2007 | Feldman | |
| 2007/0233730 A1 | 10/2007 | Johnston | |
| 2007/0266025 A1 | 11/2007 | Wagner et al. | |
| 2008/0000966 A1 | 1/2008 | Keiser | |
| 2008/0027935 A1 | 1/2008 | Sarid et al. | |
| 2008/0086698 A1 | 4/2008 | Hellman et al. | |
| 2008/0104145 A1 | 5/2008 | Lipman et al. | |
| 2008/0140643 A1 | 6/2008 | Ismalon | |
| 2008/0162305 A1 | 7/2008 | Rousso et al. | |
| 2008/0189269 A1 | 8/2008 | Olsen | |
| 2008/0208834 A1 | 8/2008 | Boyer et al. | |
| 2008/0256460 A1 | 10/2008 | Bickmore | |
| 2008/0301093 A1 | 12/2008 | Haugen et al. | |
| 2009/0070292 A1 | 3/2009 | Sigura | |
| 2009/0144259 A1 | 6/2009 | Sundaresan | |
| 2009/0150827 A1 | 6/2009 | Meyer et al. | |
| 2009/0313557 A1 | 12/2009 | Lewis et al. | |
| 2010/0049663 A1 | 2/2010 | Kane, Jr. et al. | |
| 2010/0057586 A1 | 3/2010 | Chow | |
| 2010/0063892 A1 | 3/2010 | Keronen et al. | |
| 2010/0082410 A1 | 4/2010 | Baudin et al. | |
| 2010/0094673 A1* | 4/2010 | Lobo | G06Q 30/0273 |
| | | | 705/14.54 |
| 2010/0131492 A1 | 5/2010 | Nandiraju | |
| 2010/0169361 A1 | 7/2010 | Chen et al. | |
| 2010/0241991 A1 | 9/2010 | Bickmore | |
| 2011/0035388 A1 | 2/2011 | Im et al. | |
| 2011/0161182 A1* | 6/2011 | Racco | G06Q 30/0277 |
| | | | 705/26.1 |
| 2011/0173543 A1 | 7/2011 | Cockcroft et al. | |
| 2011/0184831 A1 | 7/2011 | Dalgleish | |
| 2011/0184941 A1* | 7/2011 | El-Charif | G06F 16/951 |
| | | | 707/723 |
| 2011/0265032 A1 | 10/2011 | Weir | |
| 2012/0005045 A1 | 1/2012 | Baker | |
| 2012/0016873 A1 | 1/2012 | Mathieson et al. | |
| 2012/0099756 A1 | 4/2012 | Sherman et al. | |
| 2012/0142429 A1 | 6/2012 | Muller | |
| 2013/0006976 A1 | 1/2013 | Megler et al. | |
| 2013/0132358 A1 | 5/2013 | Nikankin et al. | |
| 2013/0226662 A1 | 8/2013 | Levine et al. | |
| 2013/0227441 A1 | 8/2013 | Cockcroft et al. | |
| 2013/0253832 A1 | 9/2013 | Nallu et al. | |
| 2013/0262228 A1 | 10/2013 | Gershon et al. | |
| 2013/0325850 A1 | 12/2013 | Redmond et al. | |
| 2013/0332290 A1* | 12/2013 | Medrano | G06Q 50/01 |
| | | | 705/14.73 |
| 2014/0058833 A1* | 2/2014 | Ouimet | G06Q 30/02 |
| | | | 705/14.49 |
| 2014/0282218 A1 | 9/2014 | Kaufman et al. | |
| 2014/0330749 A1 | 11/2014 | Candas et al. | |
| 2014/0372253 A1* | 12/2014 | Arunachalam | G06F 16/285 |
| | | | 705/26.61 |
| 2015/0026155 A1 | 1/2015 | Martin | |
| 2015/0339759 A1* | 11/2015 | Pope | G06Q 30/0631 |
| | | | 705/26.62 |
| 2016/0210368 A1 | 7/2016 | Martin | |
| 2018/0225383 A1* | 8/2018 | Martin | G06Q 30/06 |
| 2021/0248197 A1* | 8/2021 | Martin | G06Q 30/06 |

OTHER PUBLICATIONS

Dungs S. et al., "D3.3 Report on Query Specification, Result Presentation and Personalization", KHRESMOI—Grant Agreement No. 257528, Retrieved From Internet: www.khresmoi.eu, Feb. 28, 2013, 47 pages.

Eck J.V., "Two Ways of Using Google Images for Product Keywork Research", [Online], Retrieved from the Internet: URL: http://www.stateofdigital.com/TWO-WAYS-OF-USING-GOOGLE-IMAGES-FOR-PRODUCT-KEYWORD-RESEARCH#DISQUS.THREAD, Jul. 27, 2011, 7 pages.

Entire Prosecution History of U.S. Appl. No. 13/946,174, titled "Methods, Systems, and Apparatus for Generating Search Results," filed Jul. 19, 2013, 539 pages.

Entire Prosecution History of U.S. Appl. No. 15/080,845, titled "Methods, Systems, and Apparatus for Generating Search Results," filed Mar. 25, 2016, 498 pages.

U.S. Appl. No. 13/946,174, Examiner Interview Summary dated Apr. 29, 2015, 3 pages.

U.S. Appl. No. 13/946,174, Final Office Action dated Jul. 24, 2015, 24 pages.

U.S. Appl. No. 13/946,174, Non-Final Office Action dated Mar. 27, 2015, 26 pages.

U.S. Appl. No. 13/946,174, Notice of Allowance dated Nov. 3, 2015, 14 pages.

U.S. Appl. No. 13/946,174, Response filed Jun. 15, 2015 to Non-Final Office Action dated Mar. 27, 2015, 21 pages.

U.S. Appl. No. 13/946,174, Response filed Oct. 15, 2015 to Final Office Action dated Jul. 24, 2015, 18 pages.

Yaghoobi M. et al., "A Novel Fuzzy Expert System Using Image Processing for Sale Car Shape with Online Membership Function", TheJournal of Mathematics and Computer Science vol. 2 (2), 2011, http://www.tjmcs.com, pp. 222-232.

* cited by examiner

METHODS, SYSTEMS, AND APPARATUS FOR GENERATING SEARCH RESULTS

CROSS-REFERENCE TO RELATED APPLICATIONS

The present application is a continuation of U.S. application Ser. No. 15/854,691, filed Dec. 26, 2017 (now U.S. Pat. No. 10,909,194), which is a continuation of U.S. application Ser. No. 15/080,845, filed on Mar. 25, 2016 (now U.S. Pat. No. 9,852,228), which is a continuation of U.S. application Ser. No. 13/946,174, filed on Jul. 19, 2013 (now U.S. Pat. No. 9,298,785), and is also related to U.S. application Ser. No. 11/780,985, filed on Jul. 20, 2007; the disclosures of each of the above-referenced applications are incorporated by reference herein in their entireties.

TECHNICAL FIELD

The present application relates generally to commerce automation, and more specifically, in one example, to constraining a search result set.

BACKGROUND

Consumers are shopping online for a growing variety of products and services and may conduct searches to locate items that are available for purchase. The consumers of products and services may generally include retail consumers, distributors, small business owners, business representatives, corporate representatives, non-profit organizations, and the like. The providers of the products and/or services may include individuals, retailers, wholesalers, distributors, manufacturers, service providers, small business owners, independent dealers, and the like. The listing for an item that is available for purchase may comprise a price, a description of the product and/or service and, optionally, one or more specific terms for the offer.

Searches by consumers for particular products and/or services are often keyword-based and may produce an extensive list of available items of varying degrees of relevance depending on the consumer's proficiency and familiarity with the product class. In some instances, the size of the list and the relevance of the search result items may cause the consumer to delay or abandon the search, thereby diminishing the probability of executing a transaction.

BRIEF DESCRIPTION OF THE DRAWINGS

Some embodiments are illustrated by way of example and not limitation in the figures of the accompanying drawings in which:

FIG. 4 is an example representation of a user interface for performing a search for a product and/or service, in accordance with an example embodiment;

FIG. 8 is an example representation of a user interface for performing a search for a product and/or service where the right-hand filter was automatically selected, in accordance with an example embodiment;

DETAILED DESCRIPTION

In the following detailed description of example embodiments, reference is made to specific examples by way of drawings and illustrations. These examples are described in sufficient detail to enable those skilled in the art to practice these example embodiments, and serve to illustrate how the invention may be applied to various purposes or embodiments. Other embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Generally, methods, systems, and apparatus for constraining a search result set are described. In one example embodiment, a consumer may conduct a search for an item, e.g. an item available for sale. As used herein, an "item" may refer to a product and/or a service. The search result set may produce an extensive list of available items of varying degrees of relevance to the search. The consumer may select one or more items in the search result set that may be of interest to the consumer and/or on which the consumer may desire to receive additional information. In one example embodiment, the consumer may select one or more filters to constrain the search result set. In one example embodiment, one or more search parameters, such as one or more filters, to constrain the search result set may be automatically suggested or selected based on, for example, a selection of items by the consumer. In one example embodiment, one or more filters to constrain the search result set may be automatically suggested or selected based on, for example, an analysis of a search result list.

Figure 1:
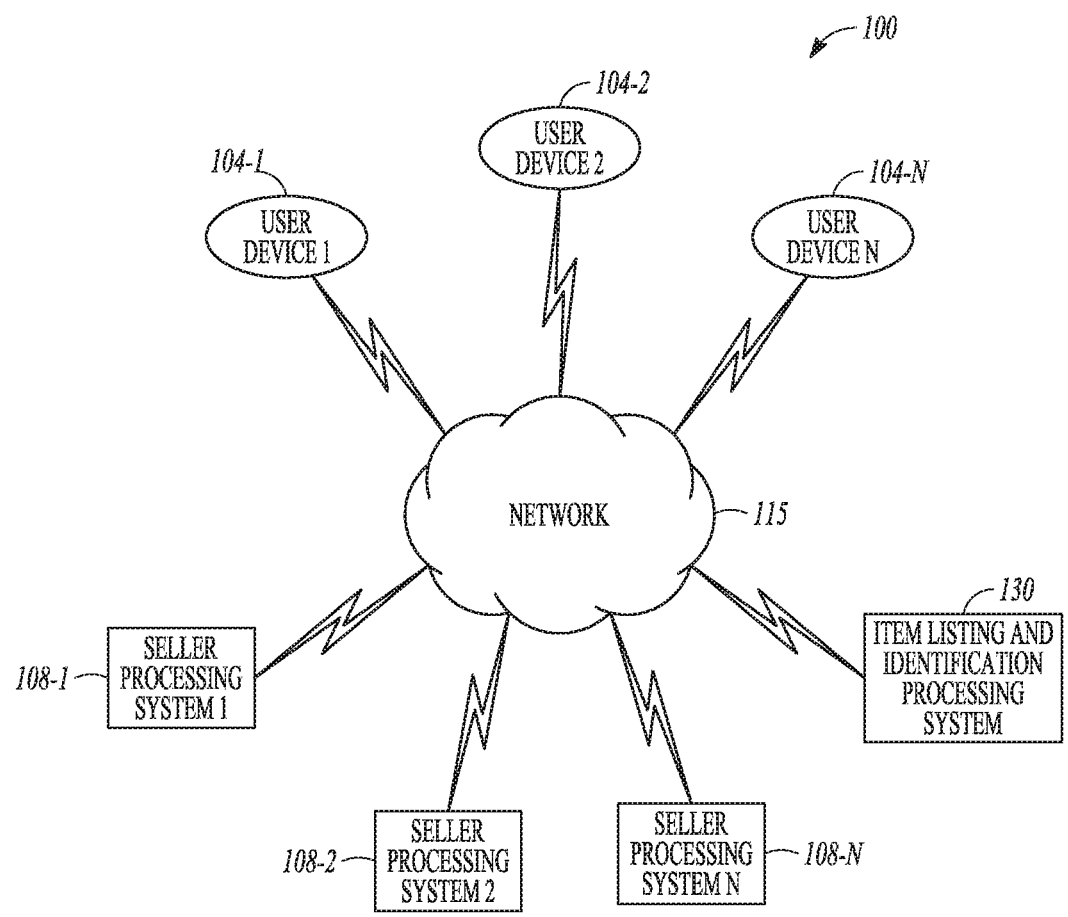
FIG. 1 is a block diagram of an example system, in accordance with an example embodiment, for searching for products and/or services.

FIG. 1 is a block diagram of an example system 100, in accordance with an example embodiment, for searching for products and/or services. In one example embodiment, the system 100 may comprise one or more user devices 104-1, 104-2 and 104-N (known as user devices 104 hereinafter), one or more optional seller processing systems 108-1, 108-2 and 108-N (known as seller processing systems 108 hereinafter), an item listing and identification processing system 130, and a network 115. Each user device (e.g., 104-1) may be a personal computer (PC), a mobile phone, a personal digital assistant (PDA), or any other appropriate computer device. Each user device (104-1, 104-2 or 104-N) may include a user interface module 306, described more fully below in conjunction with FIG. 3. In one example embodiment, the user interface module 306 may comprise a web browser program. Although a detailed description is only illustrated for user device 104-1, it is noted that each of the other user devices (e.g., user device 104-2 through user device 104-N) may have corresponding elements with the same functionality.

The optional seller processing systems 108 and the item listing and identification processing system 130 may be a server, client, or other processing device that includes an operating system for executing software instructions. The optional seller processing systems 108 may provide items for sale to a consumer, and may facilitate the search for and purchase of the items to a variety of consumers.

The network 115 may be a local area network (LAN), a wireless network, a metropolitan area network (MAN), a wide area network (WAN), a wireless network, a network of interconnected networks, the public switched telephone network (PSTN), and the like.

Each user device 104 may receive a query for item information from a user via an input device such as keyboard, mouse, electronic pen, etc. (not shown in FIG. 1). An item may comprise a product and/or a service and the corresponding information may be in the form of an item listing.

The item listing and identification processing system 130 of an online listing system may store and/or obtain information related to items available for sale. Each item listing may comprise a detailed description for the item, a picture of the item, attributes of the item, and the like. The item associated with the item listing may be a good or product (e.g., a tablet computer) and/or a service (e.g., a round of golf or appliance repair) that may be transacted (e.g., exchanging, sharing information about, buying, selling, making a bid on, and the like). The item listing may also include a title, a category (e.g., electronics, sporting goods, books, antiques, and the like), and attributes and tag information (e.g., color, size, and the like).

Referring back to the user device 104-1, the query received from the user of user device 104-1 may comprise one or more keywords. The user device 104-1 may transmit the query to the item listing and identification processing system 130 via the network 115. The item listing and identification processing system 130 may attempt to match the query keywords with the title, the category, the tag information, and/or any other field in the item listing using a search engine and may identify one or more item listings that satisfy the query. The item listing and identification processing system 130 may retrieve and then sort the item listings in the search result in a known manner. The item listing and identification processing system 130 may return a sorted search result list to the user device 104-1 that submitted the query.

The search result list may comprise a list of available items of varying degrees of relevance to the particular product or product type for which the consumer is searching. The consumer may select from the search result list one or more items that corresponds more closely to the consumer's search intention, e.g., in order to obtain additional information on the item and/or the consumer may apply one or more filters and may resubmit the query. In one example embodiment, the item listing and identification processing system 130 may suggest or select one or more search filters based, for example, on the consumer's item selection(s). The search filters may be suggested or selected by the item listing and identification processing system 130. In one example embodiment, the search filters may be suggested or selected by the item listing and identification processing system 130 only if an auto-filter mechanism is enabled. The enabling of the auto-filter mechanism may be based on an authorization by the consumer to activate the auto-filter, an analysis of a search result list, a profile of a user, and/or a condition identified by the item listing and identification processing system 130 and/or the user device 104-1. For example, the item listing and identification processing system 130 may determine that the relevance of the items in the search result list varies to an unsatisfactory degree, and/or that the size of the search result list may reduce the propensity of the consumer to execute a transaction. The decision that the propensity of the consumer to execute a transaction is reduced may be based, for example, on a threshold size of the search result list. The search may be repeated utilizing the search filters selected by the consumer and/or suggested or selected by the auto-filter mechanism.

The above described progressive search technique may enable a user to narrow a large result set based on, for example, the underlying attributes, similarities, and dissimilarities of an initial result set of items that may be obtained while conducting searches on the web in either a commerce or conventional search site context. The search result set may also be "whittled" down to a more manageable size with more relevant results.

The described search technique may also provide an assistive search service that may facilitate identification by the user of keywords and/or filters that define the scope of the user's intended search more accurately. A user who may be not familiar with the relevant terminology applicable to a particular search can often use search query keywords and/or filters that return an overly broad result set. Narrowing the scope of such a broad result set when using conventional search techniques typically requires user-provision of more restrictive search criteria, which the user may be unable to do due to a lack of the applicable vocabulary. The described method may allow the user to prompt suggestion or application of further keywords and/or filter attributes by selecting one or more search result items that more closely align with the user's search intentions, thus reducing the level of proficiency and/or product-specific linguistic facility demanded of the user to perform a usably accurate search.

In one example embodiment, a binary type of refinement may be utilized. For example, a search for golf clubs may return right-handed golf clubs, left-handed golf clubs, new golf clubs, used golf clubs, and the like. The consumer (user) may select four item listings that may be full, right-handed golf sets, and that are either new or used. In this scenario, the system may exclude items that are left-handed and may exclude items that are partial golf sets or individual clubs.

In one example embodiment, the user experience may include indications in a navigation pane, such as the left-hand navigation pane of a conventional search, of the attribute which has been eliminated from the result set and/or the respective inventory omitted from the result set. This technique may effectively eliminate items from the result set in contrast to the conventional use of a left-hand filter to explicitly retain such inventory.

In one example embodiment, the auto-filtering may focus on filtering the structured data surrounding the elements of a listing, including one or more of: 1) listing category (the specified category); 2) item attributes/aspects (category characteristics and the underlying aspects or descriptors of the attribute, e.g., size, color, dimensions, material, gender, and the like); 3) title (a character description specified by, for example, the seller); 4) description (a large free form descriptor) and 5) reviews (for example, reviews of the associated seller). The auto-filtering may focus on the following criteria: 1) listing format (e.g., auction, fixed price, best offer and the like); 2) condition (item condition (category specific), e.g., clothing: new, new without tags, and used; electronics: new, refurbished, used, and for parts); 3) free shipping; and 4) seller rating.

Figure 2:
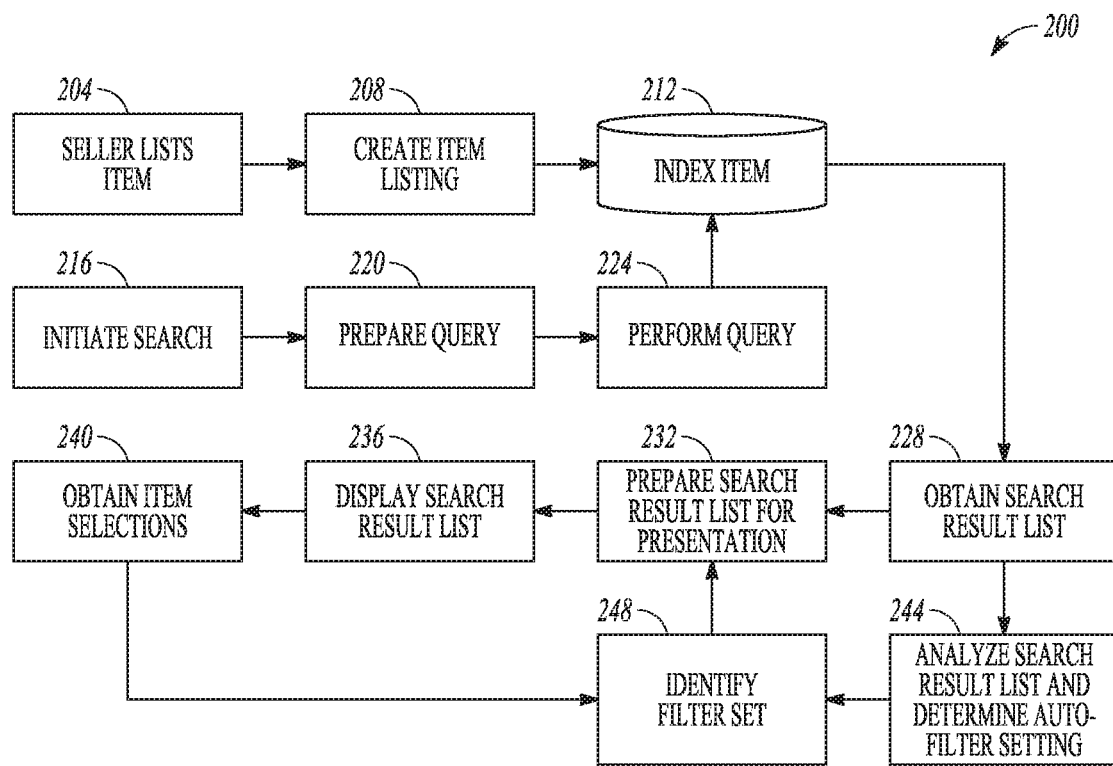
FIG. 2 is an example flowchart for an electronic commerce method for listing, indexing, and searching for a product and/or service, in accordance with an example embodiment.

FIG. 2 is an example flowchart for an electronic commerce method 200 for listing, indexing, and searching for a product and/or service, in accordance with an example embodiment. In one example embodiment, a seller may list an item for sale (operation 204). The seller may, for example, select a category for the item, submit a description of the item, submit a picture of the item, manually set attributes of the item, and the like.

An item listing may be created in, for example, an item listing database (operation 208). The listing may include, for example, attributes of the item and terms of the sale offer. During the item listing operation 208, an identification number for the item listing may be assigned, and the listing may be authenticated and scanned to check for conformance with one or more listing policies. The listed item may be indexed (operation 212) in a known manner to facilitate future searches for the item.

A consumer may launch a search or query for one or more items (operation 216). For example, a consumer may initiate a search using the keywords "golf clubs." A corresponding query may be prepared (operation 220). For example, a spell check may be performed on the query terms and a search expression may be generated based on the provided search terms.

The query may be executed on, for example, the items that have been indexed in the system (operation 224). For example, the prepared query may be matched against the index that was updated during operation 212.

In response to the execution of the query, a search result list may be obtained (operation 228). The search result list may be analyzed and an auto-filter mechanism may be enabled or disabled based, for example, on the obtained search result list (operation 244). For example, the auto-filter mechanism may be enabled if the count of items in the search result list exceeds a threshold value and/or if the auto-filter mechanism has been enabled by a user.

The search result list may be prepared for presentation (operation 232). For example, the search result list may be filtered, sorted, ranked and/or formatted based, for example, on the analysis of the search result list performed during operation 244 and based on an identified set of search filters.

The prepared search result list may be displayed (operation 236). In response to reviewing the displayed search result list, one or more item selections from one or more displayed item pages may be obtained from a user (operation 240).

One or more search filters may be identified and enabled (operation 248). The selection of filters may be performed as described herein. For example, the search result list and/or user item selections may be analyzed to determine the filter set.

If a user indicates that a search should be broadened, such as expanding a search for new, right-handed golf clubs to a search for right-handed golf clubs that are new or used, a new query may be conducted.

In one example embodiment, the auto-filter mechanism may be disabled as a result, for example, of analyzing the displayed search result list and/or the user's item selections. For example, if item selections by a user has resulted in the automatic application of additional filters and the search result list has been reduced to comprise a count of items that is less than a threshold value, the auto-filter mechanism may be disabled.

Figure 3:
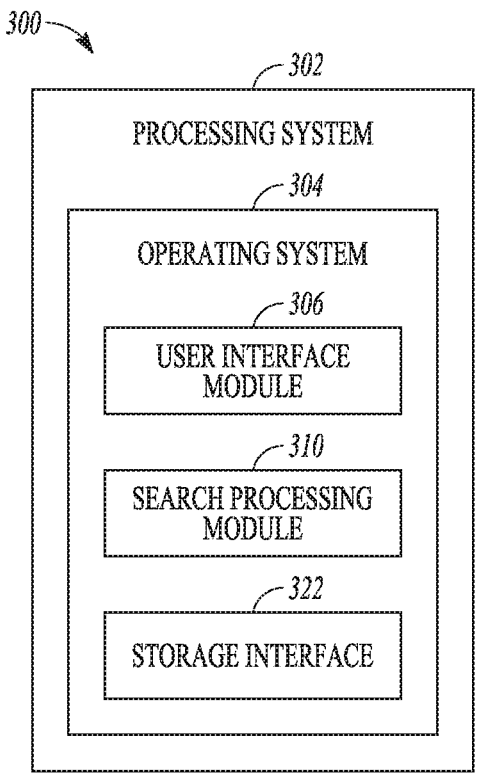
FIG. 3 is a block diagram of an example system, in accordance with an example embodiment, for initiating and conducting a search for products and/or services.

FIG. 3 is a block diagram of an example system 300, in accordance with an example embodiment, for initiating and conducting a search for products and/or services. The system 300 is shown to include a processing system 302 that may be implemented on a client or other processing device that includes an operating system 304 for executing software instructions.

In accordance with an example embodiment, the system 300 may include a user interface module 306 and a search processing module 310. In accordance with an example embodiment, the system 300 may further include a storage interface 322.

The user interface module 306 may obtain search criteria from a user (consumer), may present a search result list to a user, may obtain search filter settings from a user, and may suggest and/or indicate filter settings to a user.

The search processing module 310 may submit a query to the item listing and identification processing system 130, may obtain a search result list from the item listing and identification processing system 130, may obtain search filter settings from the user and/or the item listing and identification processing system 130, and may determine search filter settings based on, for example, item selections of the user, an analysis of the search result list, and the like.

Figure 4:
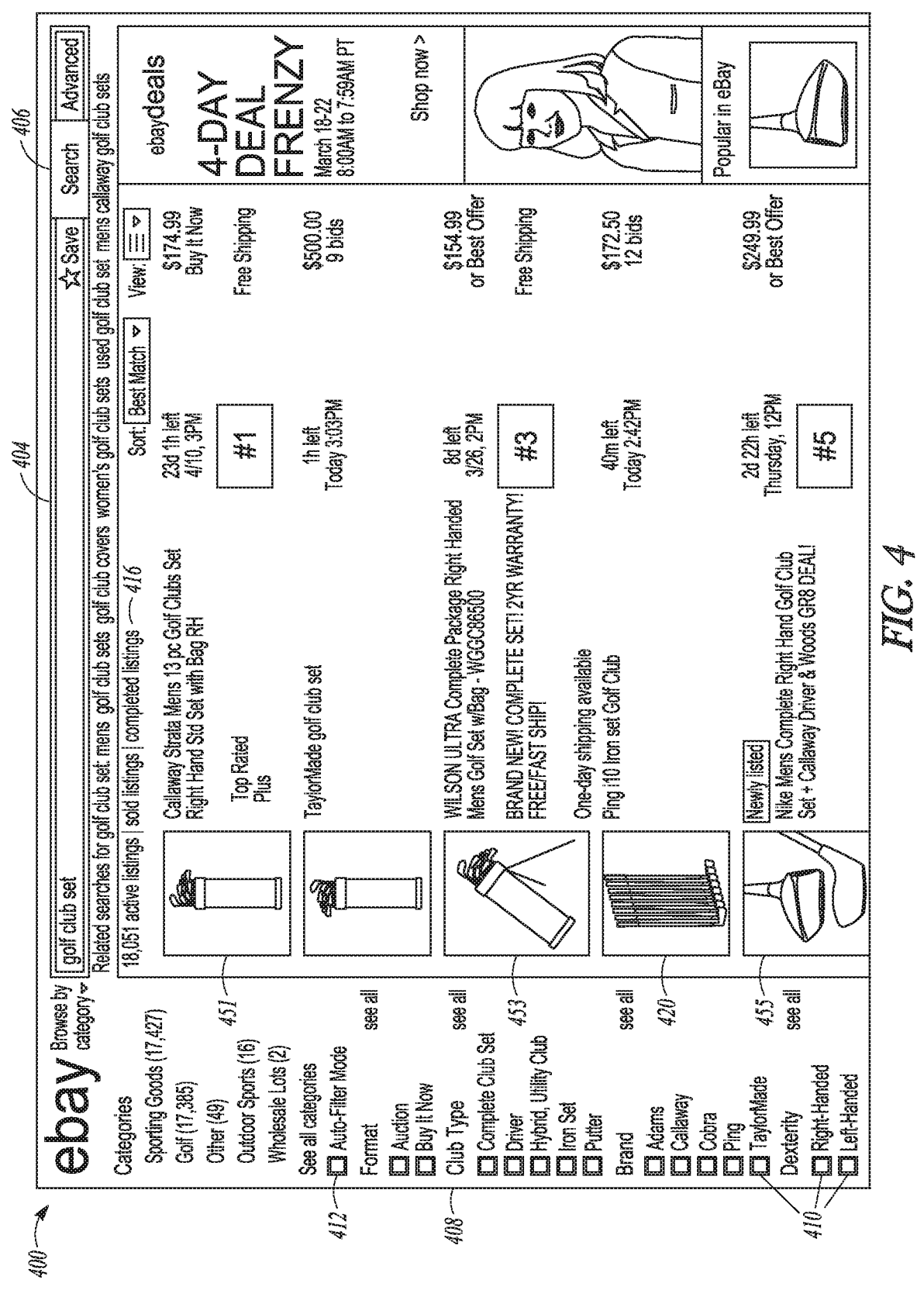

FIG. 4 is an example user interface representation 400 of a user interface for performing a search for a product and/or service, in accordance with an example embodiment. In one example embodiment, the user interface representation 400 may be utilized by user device 104-1 to enable a user to conduct a search for an item.

In one example embodiment, one or more keywords may be entered in a search field 404 and a search button 406 may be selected to initiate the search. The search may be constrained by the search filter settings identified by filter selection indicators 410 in a filter selection area 408. An auto-filter mode may be enabled by selecting the auto-filter selection indicator 412. One or more items may be displayed in a search result list area 416. In the example user interface representation 400, the items in the search result list area 416 are a variety of sets of golf clubs. Golf sets 451, 453, 455 are right-handed golf sets. In one example embodiment, a selection of only golf sets 451, 453, 455 by a user may be interpreted as an indication that the user is interested in only right-handed golf sets. A right-handed filter may be suggested or selected in response to a user selection of golf sets 451, 453, 455.

Figure 5:
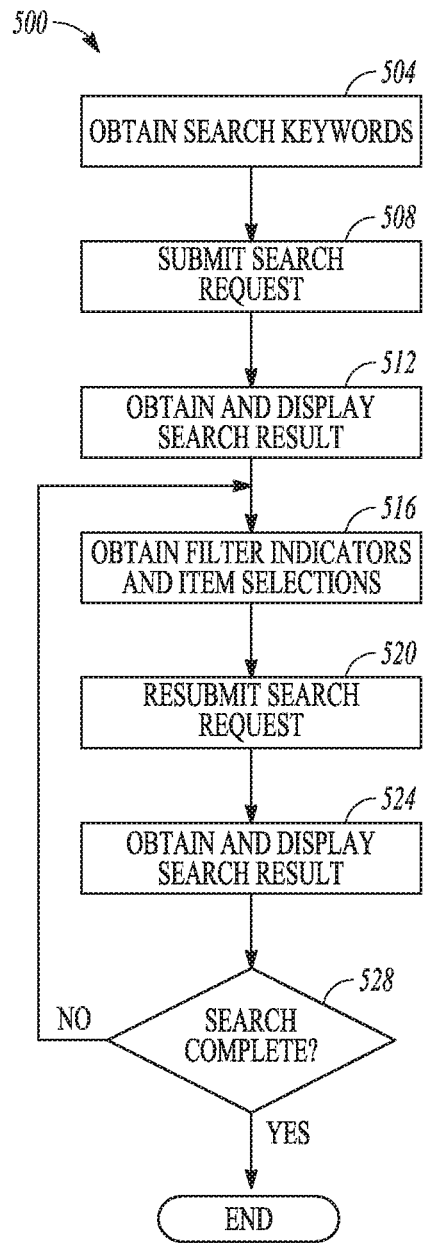
FIG. 5 is an example flowchart for a user interface method for performing a search for a product and/or service, in accordance with an example embodiment.

FIG. 5 is an example flowchart for a user interface method 500, in accordance with an example embodiment. In one example embodiment, one or more of the operations of the user interface method 500 may be performed by the user device 104-1.

One or more keywords and filter identifications may be obtained from a user initiating a search for a product and/or service by entering the one or more keywords via the input search field 404 (operation 504). The user may also indicate whether an auto-filter mode should be activated by selection of the auto-filter selection indicator 412. The search may be submitted (operation 508) to, for example, the item listing and identification processing system 130. A search result list may be obtained from the item listing and identification processing system 130 and displayed in the search result list area 416 (operation 512).

One or more item selections from the search result list area 416 and/or one or more search filters identified by the filter selection indicators 410 may be obtained (operation 516). The user may also indicate whether an auto-filter mode should be activated by selection of the auto-filter selection indicator 412. The keyword search may be resubmitted to the item and listing identification processing system 130 by selecting the search button 406 (operation 520). An updated search result list may be presented in the search result list area 416. In addition, any filters selected by the auto-filter mechanism may be indicated by an "x" mark next to the corresponding filter selection indicators 410 in the filter selection area 408 and any filters whittled away by the auto-filter mechanism may be indicated by a strikethrough of the corresponding filter selection indicator 410 in the filter selection area 408 (operation 524). A test may be performed to determine if the search is complete (operation 528). If the search is complete, the method may end.

If the search is not complete, the user may select one or more items from the search result list area 416 and/or may change one or more of the filter selection indicators 410 and the auto-filter selection indicator 412 (operation 516) and the method may proceed with operation 520.

In one example embodiment, during operation 512, the auto-filter mechanism, as described herein, may be executed prior to displaying the search result list. For example, if the size of the search result list may reduce the propensity of the consumer to execute a transaction, the search result list may be reduced by, for example, excluding the least relevant item(s).

Figure 6:
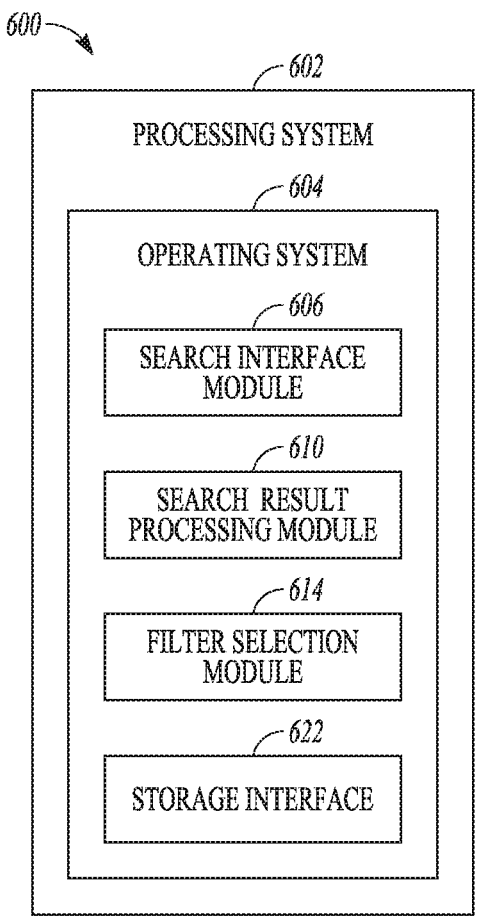
FIG. 6 is a block diagram of an example apparatus, in accordance with an example embodiment, for performing a search for products and/or services.

FIG. 6 is a block diagram of an example apparatus 600, in accordance with an example embodiment, for performing a search for products and/or services. The apparatus 600 is shown to include a processing system 602 that may be implemented on a client or other processing device that includes an operating system 604 for executing software instructions. In accordance with an example embodiment, the apparatus 600 may include a search interface module 606, a search result processing module 610, and a filter selection module 614. In accordance with an example embodiment, the apparatus 600 may further include a storage interface 622. In one example embodiment, the apparatus 600 may be a component of the user device 104-1 and/or may be a component of the item listing and identification processing system 130.

The search interface module 606 may obtain a search result list from the user device 104-1 and/or from the item listing and identification processing system 130, may obtain consumer item selections from the user device 104-1 and/or from the item listing and identification processing system 130, and may obtain consumer filter selections from the user device 104-1 and/or from the item listing and identification processing system 130. The search interface module 606 may provide auto-filter suggestions and/or auto-filter selections to the user device 104-1 and/or to the item listing and identification processing system 130.

The search result processing module 610 may process a profile of a consumer and/or a search result list to determine if the auto-filter mechanism should be utilized. For example, the auto-filter mechanism may be utilized if the consumer is inexperienced in online commerce. For example, the search result processing module 610 may determine that the propensity to buy may be abnormally low based on the ambiguity of the query and/or the size or diversity of the result set, and may enable the auto-filter mechanism. The search result processing module 610 may also process a profile of a consumer and/or a search result list to determine if the auto-filter mode should be automatically disabled. For example, the search result processing module 610 may determine that the propensity to buy may be at a normal or high level and may determine that the auto-filter mechanism is not needed and may be disabled.

The filter selection module 614 may process the search result list, the consumer item selections, the consumer profile and/or the consumer filter selections to identify one or more search filters, as described herein. In one example embodiment, the identified filters may be automatically selected. In one example embodiment, the identified filters may be automatically suggested to a user.

Figure 7:
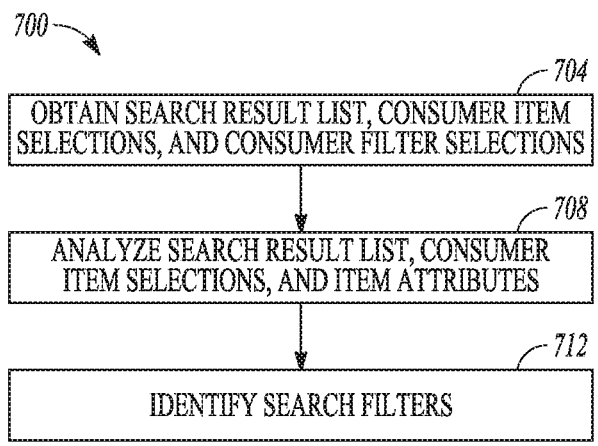
FIG. 7 is an example flowchart for a filter identification method, in accordance with an example embodiment.

FIG. 7 is an example flowchart for a filter identification method 700, in accordance with an example embodiment. In one example embodiment, one or more of the operations of the filter identification method 700 may be performed by the apparatus 600.

A search result list, consumer item selections, and/or consumer filter selections may be obtained (operation 704). The attributes of each item selection may be compared and, optionally, the attributes of search result items not selected by the consumer may be compared (operation 708). One or more search filters may be identified based on the results of the comparisons, the search result list, the consumer item selections, and/or the consumer filter selections (operation 712). For example, if an attribute of all the selected items is an alternative of an attribute of all the non-selected items, the filter corresponding to the attribute of the selected items may be identified. For example, if the count of items in the search result list exceeds a threshold value, one or more filters may be identified and selected or suggested to a user. In one example embodiment, if an attribute of most of the selected items is the same, the filter corresponding to the cited attribute of the selected items may be identified.

In one example embodiment, the search filters may be suggested or selected only if an auto-filter mechanism is enabled. The enabling of the auto-filter mechanism may be based on an authorization by the consumer to activate the auto-filter and/or by a condition identified by the item listing and identification processing system 130 and/or the user device 104-1. For example, the item listing and identification processing system 130 may determine that the relevance of the search results varies to an unsatisfactory degree and/or that the size of the search result list may reduce the propensity of the consumer to execute a transaction. The propensity of the consumer to execute a transaction may be based, for example, on a threshold size of the search result list.

Returning to FIG. 4, assume the consumer is shopping for golf clubs and selects only items that feature right-handed golf clubs, e.g., items 451, 453, and 455. The filter identification method 700 would recognize that the selected items have a right-hand attribute and that the non-selected items are primarily left-handed golf clubs. As a result, the filter identification method 700 would identify the right-hand filter. The filter identification method 700 would recognize that the criteria of format, club type, brand, and condition are not deterministic and would not identify the corresponding filters. If the auto-filter mode is enabled, the right-hand filter may be automatically selected and may be marked with an "x" in the filter selection area 408. If the auto-filter mode is not enabled, the right-hand filter may be suggested as a filter for selection by the consumer.

In one example embodiment, a "whittling" mode may be used for criteria that, for example, are characterized by a spectrum of aspects. For example, an item may be available in a spectrum of colors and it may be difficult to identify one or more colors of interest to the consumer; rather, it may be possible to iteratively identify colors that are not of interest. The colors that are not of interest may be methodically "whittled away." An attribute that has been whittled away may be identified by striking through the text of the corresponding filter selection indicator 410, indicating that items with characteristics that match the filter will be excluded from the search result list. Thus, an exclusionary filter that excludes items from a search result set may be identified, the identification based on the user item selections having an attribute that is an alternative to an attribute corresponding to the exclusionary filter.

In one example embodiment, a numerical representation of the item is created such that identical items get an identical code, and a similar item gets a relatively similar code. In this embodiment, the numerical representation along with a variance may be used to identify similar items. The numerical representations may be used to exclude less relevant items from a search result list. For example, upon execution of a statistically significant number of listing views and a detection of a concentric variance of the selected items, one or more filters may be suggested or selected.

Figure 8:
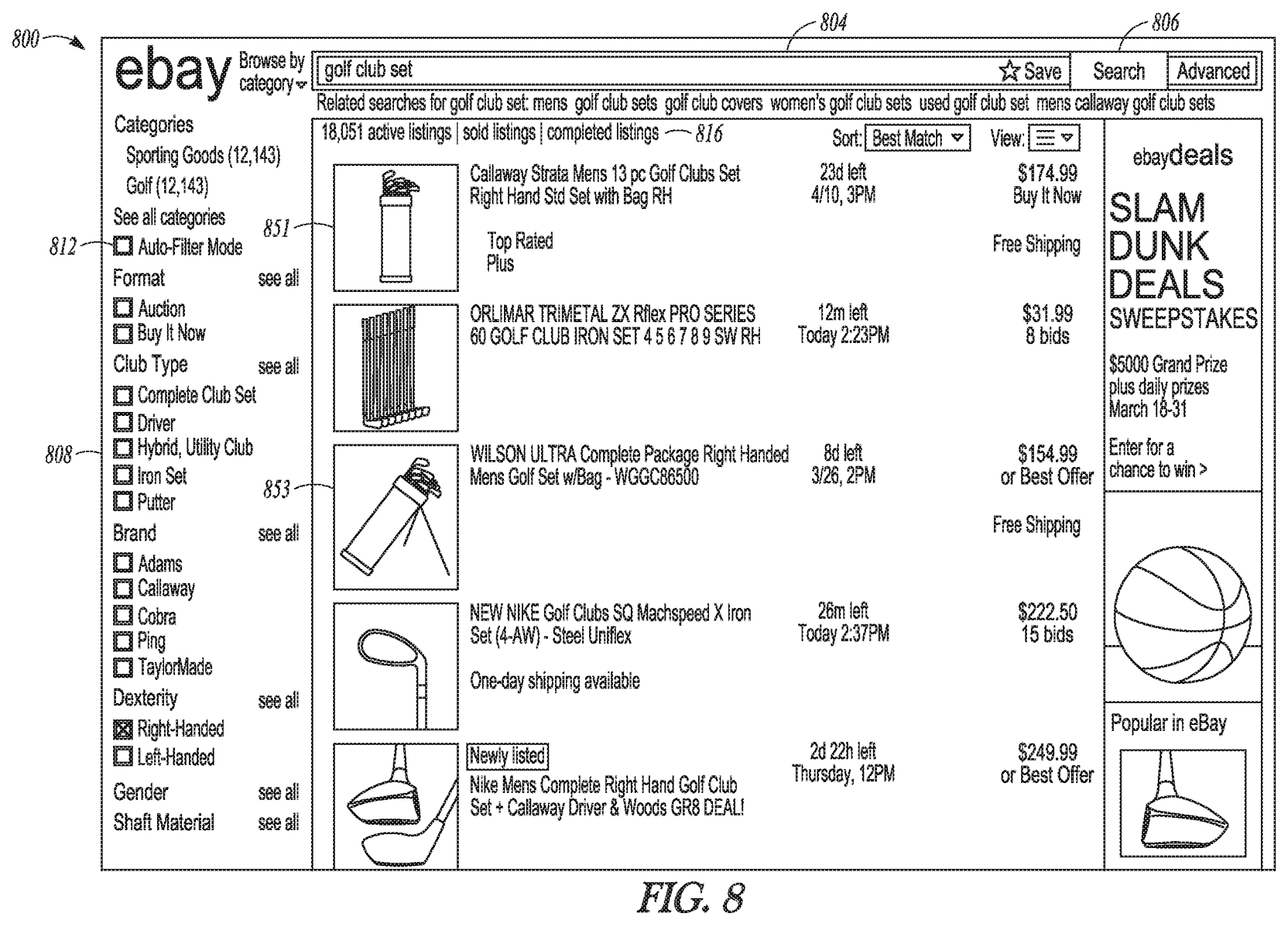

FIG. 8 is an example representation 800 of a user interface for performing a search for a product and/or service where the right-hand filter was automatically selected, in accordance with an example embodiment. In one example embodiment, the user interface representation 800 may be utilized by user device 104-1 to enable a user to conduct a search for an item.

In one example embodiment, one or more keywords may be entered in search field 804 and a search button 806 may be selected to initiate the search. The search may be constrained by the search filter settings identified by filter selection indicators 810 in a filter selection area 808. An auto-filter mode may be enabled by selecting the auto-filter selection indicator 812. One or more items 851, 853 may be displayed in a search result list area 816. In the example user interface representation 800, the items in the search result list area 816 are a variety of sets of golf clubs. As shown in FIG. 8, the right-hand filter indicator is marked with an "x" and only right-hand golf clubs are displayed in the search result list area 816.

Figure 9:
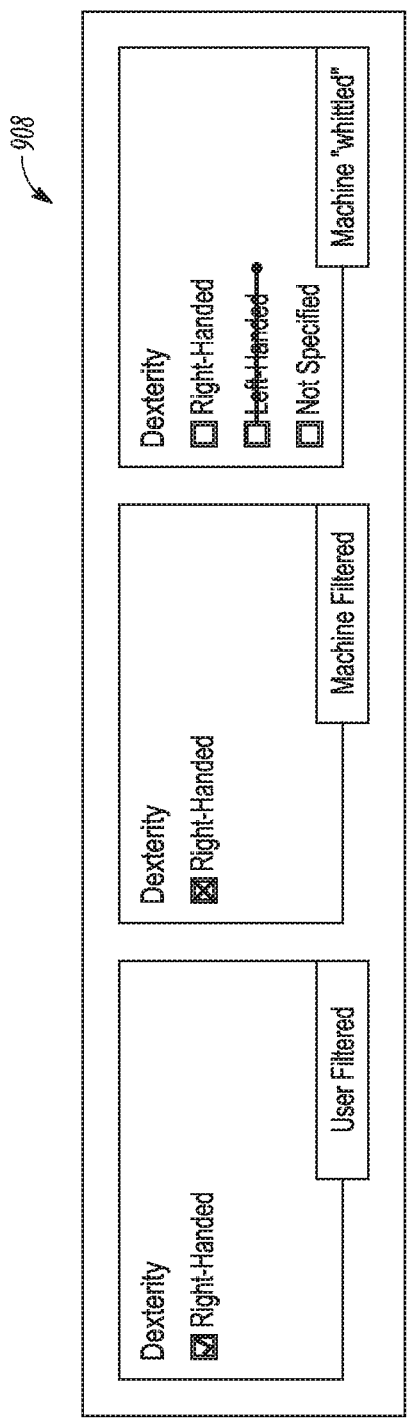
FIG. 9 is an example representation of a filter interface for constraining a search result for a product and/or service, in accordance with an example embodiment.

FIG. 9 shows example representations of the filter selection area 908 where the search result for a product and/or service is constrained for right-handed items, in accordance with an example embodiment. As illustrated in FIG. 9, a user selected filter may be indicated by a "check mark" and a machine selected filter may be indicated by an "x." A characteristic that is whittled away, such as the "left-handed" characteristic, may be indicated by a strikethrough.

Although certain examples are shown and described here, other variations exist and are within the scope of the invention. It will be appreciated, by those of ordinary skill in the art, that any arrangement, which is designed or arranged to achieve the same purpose, may be substituted for the specific embodiments shown. This application is intended to cover any adaptations or variations of the example embodiments of the invention described herein. It is intended that this invention be limited only by the claims, and the full scope of equivalents thereof.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
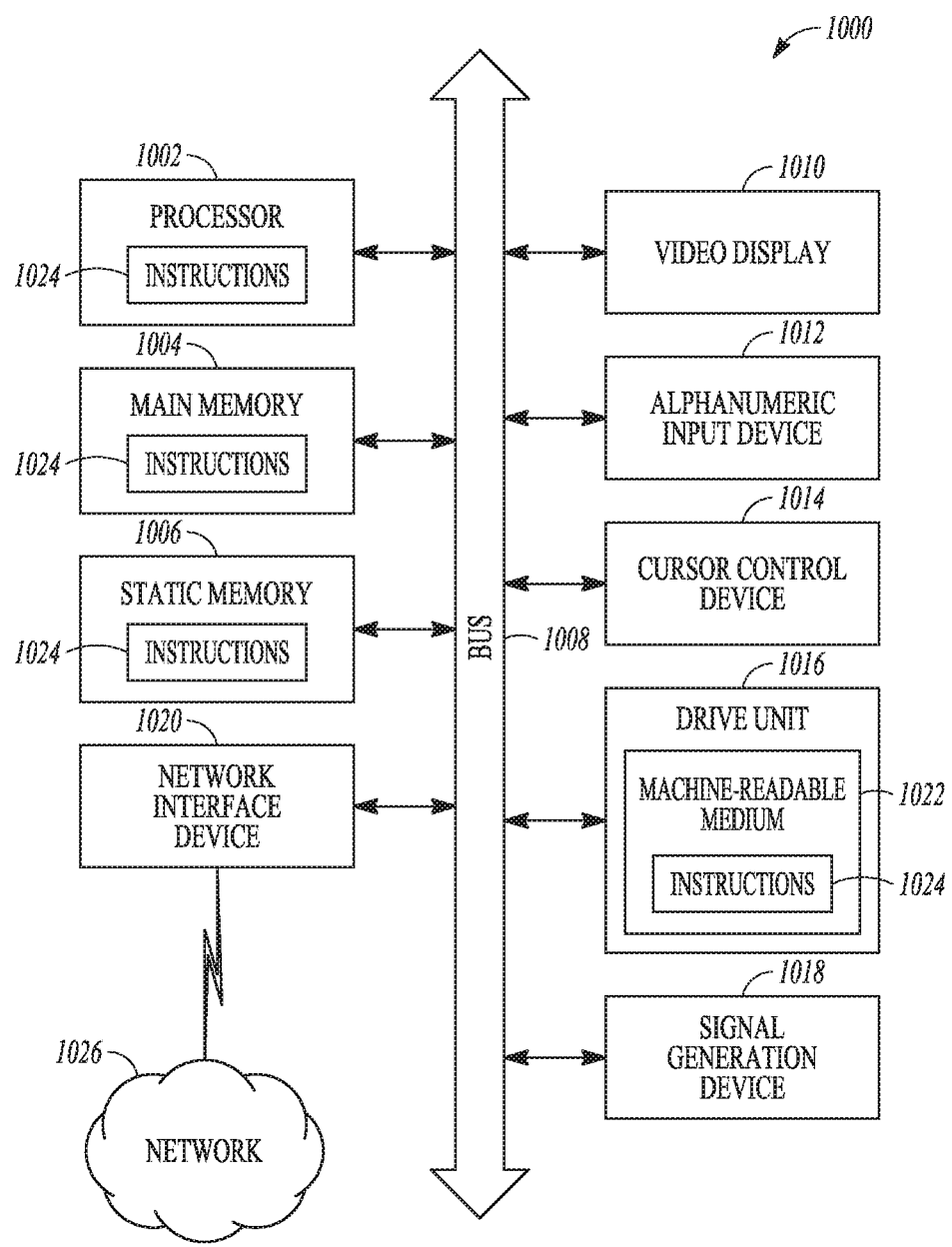
FIG. 10 is a block diagram of machine within which instructions may be executed for causing the machine to perform any one or more of the methodologies discussed herein.

FIG. 10 is a block diagram of a machine within which instructions may be executed for causing the machine to perform any one or more of the methodologies discussed herein. In one example embodiment, the machine may be the example apparatus 300 of FIG. 3 for initiating and conducting a search for products and/or services. In one example embodiment, the machine may be the example apparatus 600 of FIG. 6 for performing a search for products and/or services. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

Machine-Readable Medium

The drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media. Instructions 1024 may also reside within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures 1024. The term "machine-readable medium" shall also be taken to include any tangible medium that is capable of storing, encoding or carrying instructions 1024 for execution by the machine and that cause the machine to perform any one or more of the methodologies of the present invention, or that is capable of storing, encoding or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 1024 for execution by the machine, and includes digital or analog communications signals or other intangible media to facilitate communication of such software 1024.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   one or more processors; and
   one or more machine-readable storage media having instructions stored thereon that, in response to being executed by the one or more processors, cause the system to perform operations comprising:
   receiving a query request from a user device, the query request including at least one user selected item from a search set that includes a plurality of items;
   analyzing the search set by:
   identifying first attributes of the at least one user selected item, wherein the first attributes are common to a majority of the at least one user selected item; and
   identifying second attributes of one or more unselected items from the search set, wherein the second attributes are common to a majority of the one or more unselected items;
   using the identified first and second attributes, filtering one or more of the plurality of items from the search set, wherein the filtering occurs at a search result processing module used for processing a consumer profile and a search result, and wherein the filtering includes filtering search terms in the search set based on a count of items in a search result; and
   presenting, an updated search result after the filtering.

2. The system of claim 1, filtering the search terms in the search set based on the count of items in the search result includes selecting an additional filter in response to determining that the count exceeds a threshold number.

3. The system of claim 2, selecting the additional filter includes identifying a filter that corresponds to a portion of the items in the search result.

4. The system of claim 2, wherein the updated search result is based in part on a profile of a user.

5. The system of claim 1, wherein attributes include category characteristics.

6. The system of claim 1, wherein using the identified first and second attributes includes identifying attributes that are included in the first attributes and excluded from the second attributes.

7. The system of claim 1, wherein the filtering is performed by a candidate filter, and the candidate filter is identified based on a user item selection.

8. A method comprising:
   receiving a query request from a user device, the query request including at least one user selected item from a search set that includes a plurality of items;

analyzing the search set by:
  identifying first attributes of the at least one user selected item, wherein the first attributes are common to a majority of the at least one user selected item; and
  identifying second attributes of one or more unselected items from the search set, wherein the second attributes are common to a majority of the one or more unselected items;
using the identified first and second attributes, filtering one or more of the plurality of items from the search set, wherein the filtering occurs at a search result processing module used for processing a consumer profile and a search result;
filtering search terms in the search set based on a count of items in a search result; and
presenting, an updated search result after the filtering.

9. The method of claim 8, wherein filtering the search terms in the search set based on the count of items in the search result includes selecting an additional filter in response to determining that the count exceeds a threshold number.

10. The method of claim 9, selecting the additional filter includes identifying a filter that corresponds to a portion of the items in the search result.

11. The method of claim 9, wherein the updated search result is based in part on a profile of a user.

12. The method of claim 8, wherein attributes include category characteristics.

13. The method of claim 8, wherein using the identified first and second attributes includes identifying attributes that are included in the first, but not the second attributes.

14. The method of claim 8, wherein the filtering is performed by a candidate filter, and the candidate filter is identified based on a user item selection.

15. A non-transitory machine-readable medium having stored thereon machine-readable instructions executable to cause a machine to perform operations comprising:
  receiving a query request from a user device, the query request including at least one user selected item from a search set that includes a plurality of items;
  analyzing the search set by:
    identifying first attributes of the at least one user selected item, wherein the first attributes are common to a majority of the at least one user selected item; and
    identifying second attributes of one or more unselected items from the search set,
    wherein the second attributes are common to a majority of the one or more unselected items;
  using the identified first and second attributes, filtering one or more of the plurality of items from the search set, wherein the filtering occurs at a search result processing module used for processing a consumer profile and a search result;
  filtering search terms in the search set based on a count of items in a search result; and
  presenting, an updated search result after the filtering.

16. The non-transitory machine-readable medium of claim 15, wherein filtering the search terms in the search set based on the count of items in the search result includes selecting an additional filter in response to determining that the count exceeds a threshold number.

17. The non-transitory machine-readable medium of claim 16, wherein selecting the additional filter includes identifying a filter that corresponds to a portion of the items in the search result.

18. The non-transitory machine-readable medium of claim 15, wherein attributes include category characteristics.

19. The non-transitory machine-readable medium of claim 15, wherein the search set is sorted and ranked.

20. The non-transitory machine-readable medium of claim 15, wherein using the identified first and second attributes includes identifying attributes included in the first, but not the second attributes.

* * * * *